Oct. 29, 1929. W. W. POTTER 1,733,426
MACHINE TOOL
Filed March 28, 1925 7 Sheets-Sheet 1

INVENTOR.
W. W. Potter
BY
ATTORNEY.

Oct. 29, 1929. W. W. POTTER 1,733,426
MACHINE TOOL
Filed March 28, 1925 7 Sheets-Sheet 2

INVENTOR.
W. W. Potter
BY Chas. J. Williamson
ATTORNEY.

Oct. 29, 1929.  W. W. POTTER  1,733,426
MACHINE TOOL
Filed March 28, 1925   7 Sheets-Sheet 3

INVENTOR.
W. W. Potter
BY Chas. J. Williamson
ATTORNEY.

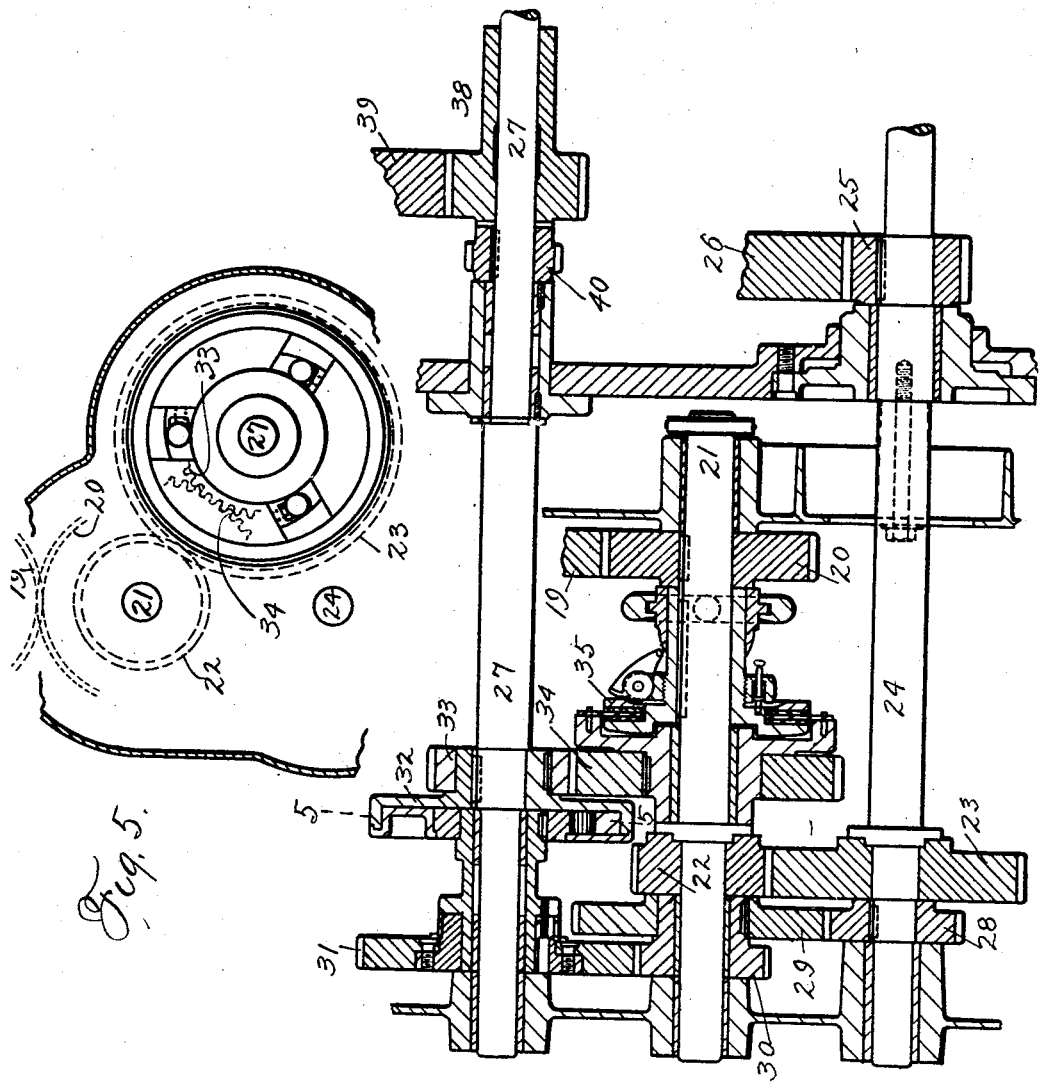

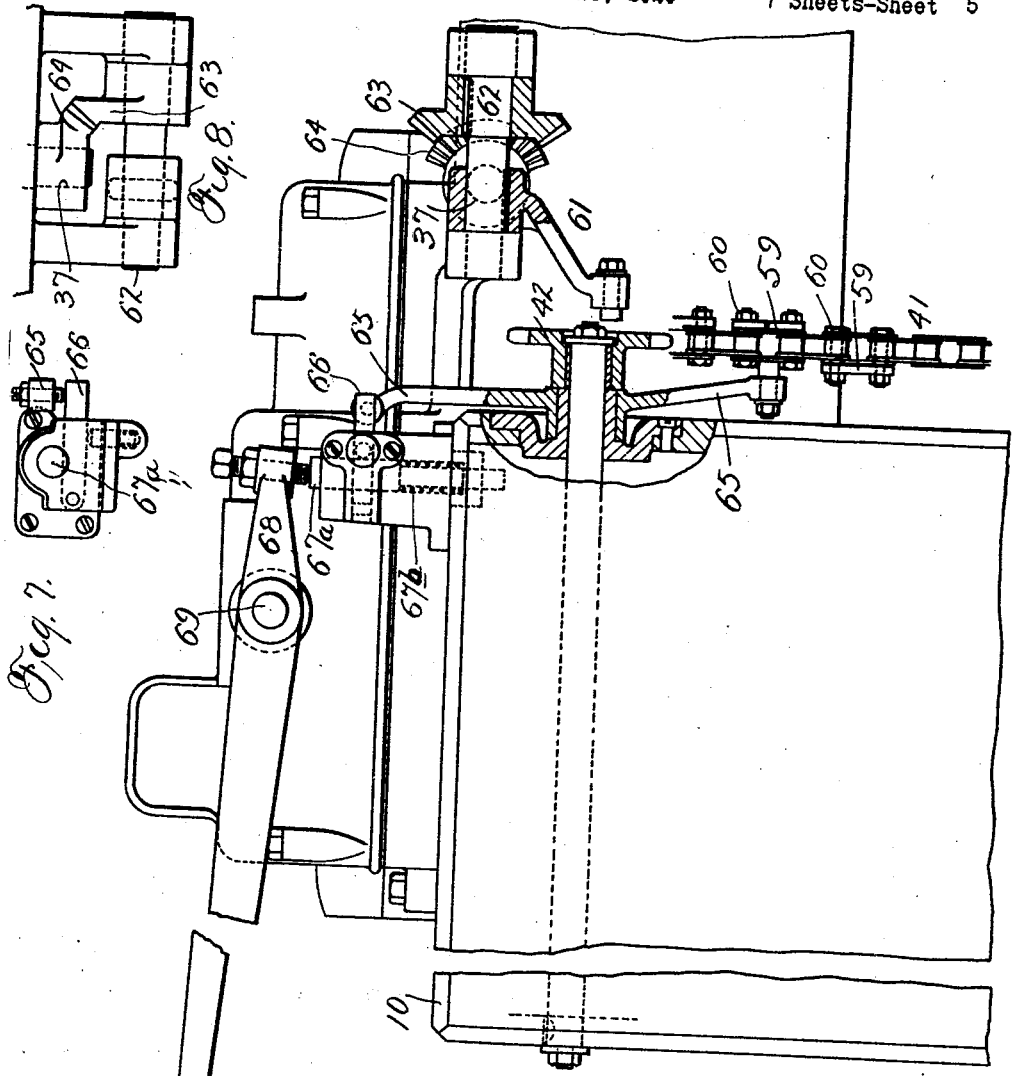

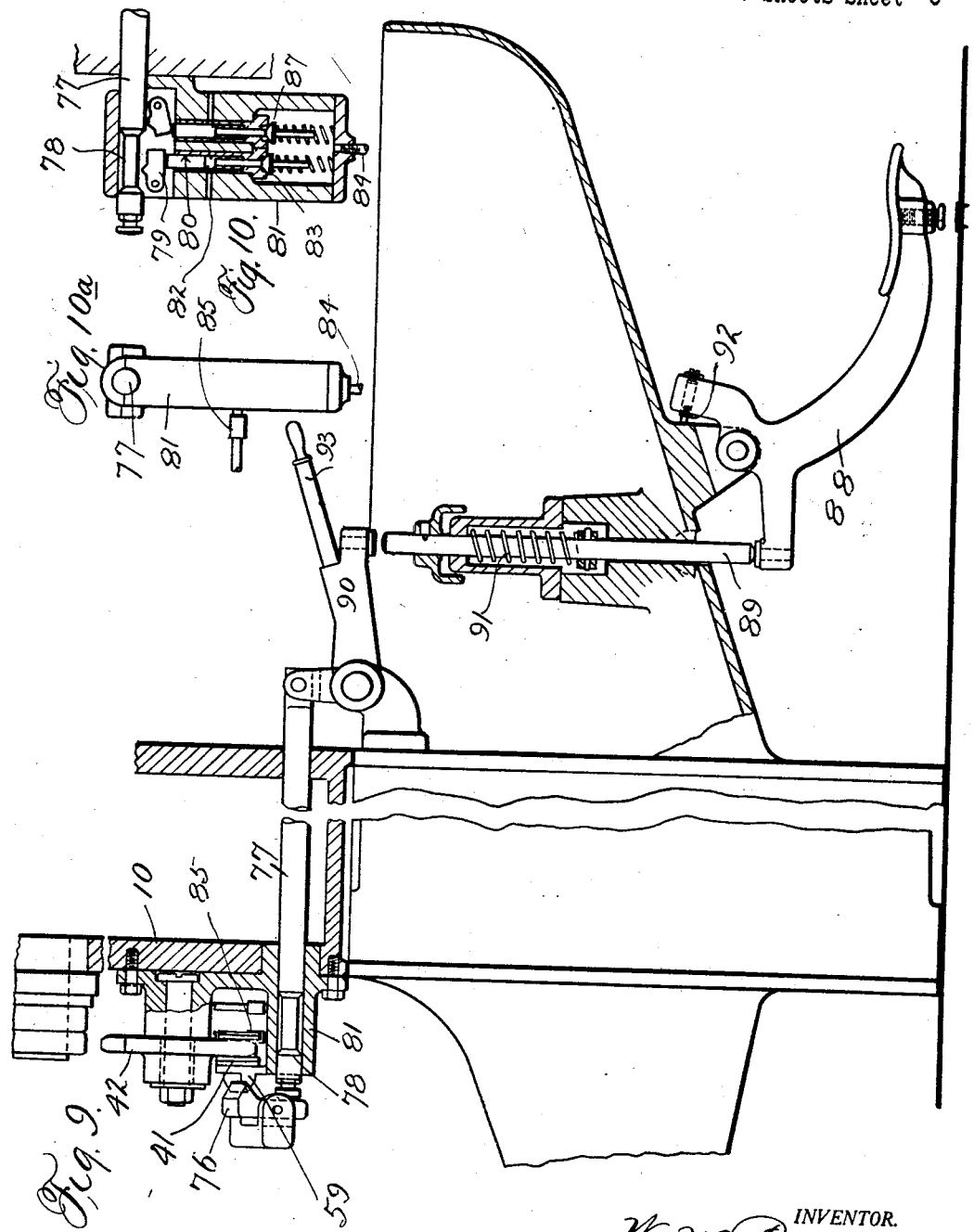

Oct. 29, 1929.　　　W. W. POTTER　　　1,733,426
MACHINE TOOL
Filed March 28, 1925　　7 Sheets-Sheet 7
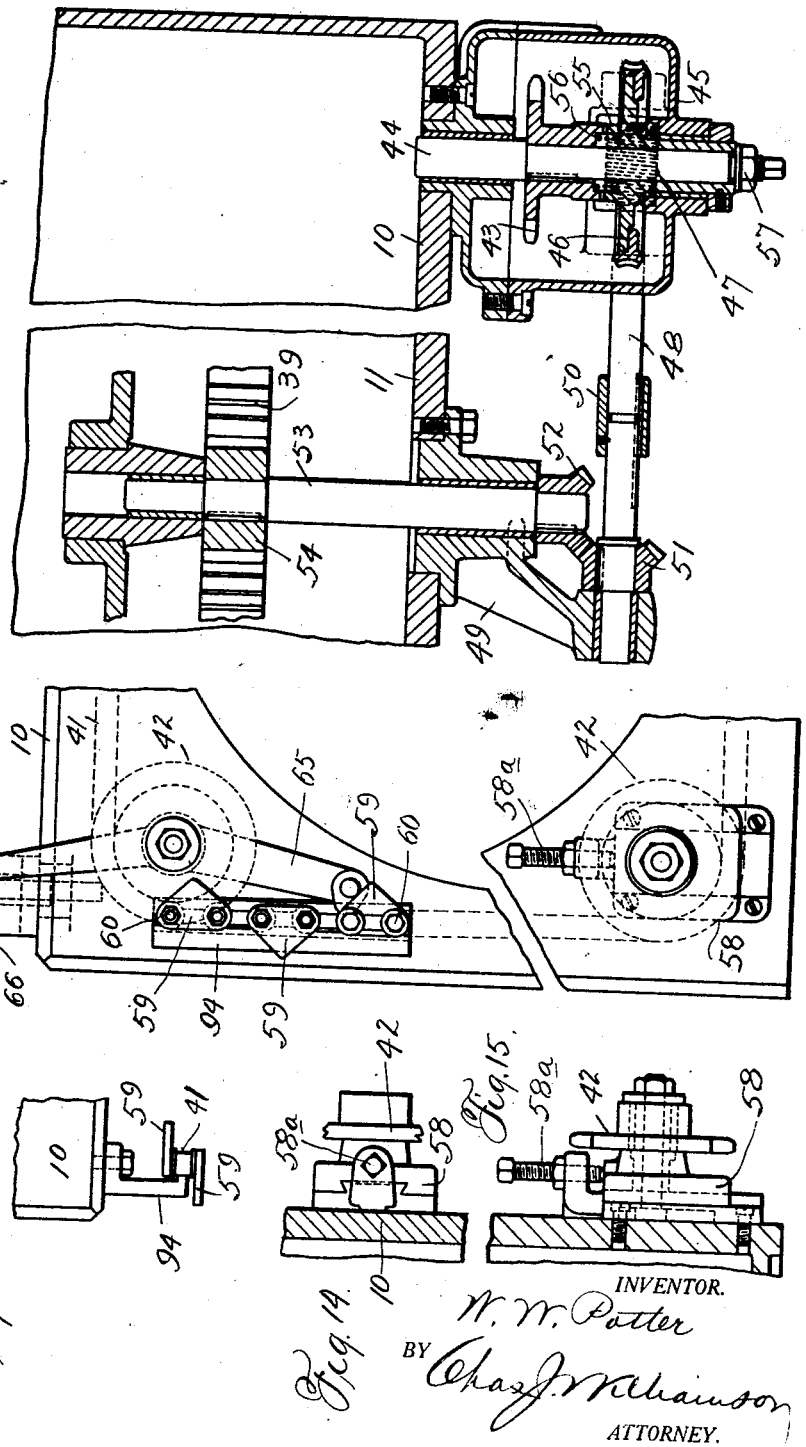
INVENTOR.
W. W. Potter
BY Chas. J. Williamson
ATTORNEY.

Patented Oct. 29, 1929

1,733,426

UNITED STATES PATENT OFFICE

WILLIAM WALLACE POTTER, OF PAWTUCKET, RHODE ISLAND

MACHINE TOOL

Application filed March 28, 1925. Serial No. 19,086.

My invention relates to machine tools and in particular to a type of construction which forms the subject of my pending United States application No. 679,965 which comprises a two-part casing or housing one within the other, the inner casing enclosing and supporting the work-holder or spindle and the tool supports and the gearing for imparting movement to and controlling the action of the operative members of the machine, the inner casing member being removable and replaceable with all parts carried thereby. The especial aim of the present invention is to give a machine of the type described aptitude or capacity for certain special work, such as turning the races of ball-bearings and similar shapes, but I have also had in view features of construction that may be advantageously employed in other types of metal working machines and hence my invention comprehends whatever is described or is included in the terms or scope of the appended claims.

In the annexed drawings:

Fig. 4 is of similar view also showing a portion of the gearing;

Fig. 5 is a detail view in cross section on the line 5—5 of Fig. 4;

Fig. 6 is a view partly in elevation and partly in section of the mechanism for controlling the running of the machine;

Fig. 7 is a detail view of the latch device of said control mechanism;

Fig. 8 is a detail view of the gear connection between the operating crank and the clutch of said mechanism;

Fig. 9 is a detail view in longitudinal section of the compressed air mechanism for operating the chuck;

Fig. 10 is a detail view in section of the valve device for controlling the flow of air to operate the chuck;

Figure 1:
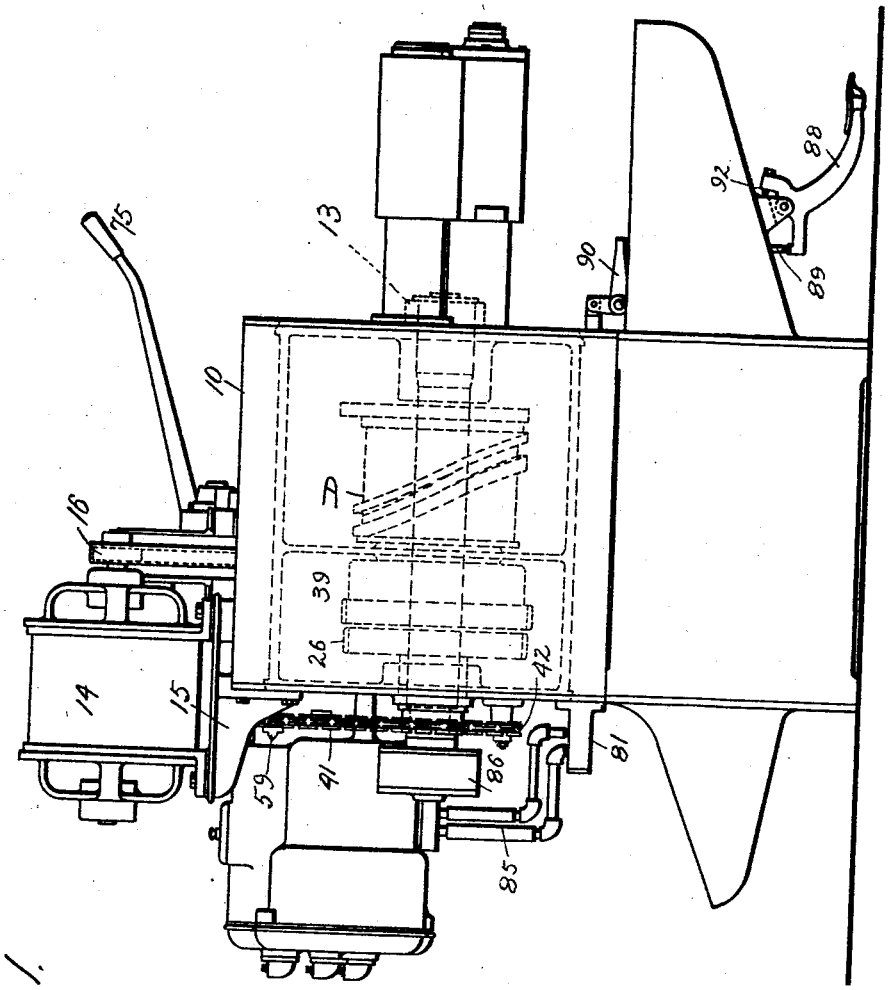
Fig. 1 is a side elevation of a machine tool embodying my invention.

Fig. 10ª is a side elevation thereof;

Fig. 11 is a detail view in section showing the detachable shaft connection for facilitating the removal of the inner casing member;

Fig. 12 is a detail view in elevation of the dog-carrying chain and one of the dog operated devices;

Fig. 13 is a detail view of a chain guide;

Fig. 14 is a top plan view and Fig. 15 is a side elevation of a device for adjusting the tension of the dog-carrying chain.

Proceeding now with a description in detail of what is shown in the drawings, the two-part casing or housing comprises the external casing member, 10, and the internal casing member, 11, which fits within and is endwise insertable and removable from the external casing member, 10, and journalled in bearings substantially at the center of the inner casing member and extending longitudinally thereof is a work spindle, 12, which at the front of the machine has a chuck, 13, the opening and closing of the chuck being effected by compressed air as hereinafter described. For driving the machine an electric motor, 14, is mounted on a bracket, 15, on the top of the outer casing member, 10, the rotor of which is connected by a chain drive, 16, with the main driving shaft, 17, mounted in bearings in a casing, 18, situated on the top of the machine. On the drive shaft, 17, is fixed a gear, 19, which meshes with a gear, 20, fixed to a shaft, 21, which is termed the constant speed shaft and which by trains of gearing presently described is geared to the spindle to rotate the same and to a feed shaft by which the to and fro movement of the cutting tool holders relative to the work of the spindle is accomplished there being nothing new in this present invention in this general arrangement. Upon the shaft, 21, is fixed a gear, 22, which meshes with a gear, 23, on a shaft, 24, to which is keyed a pinion, 25, that meshes with a gear, 26, on the spindle to revolve the latter. The gears, 22 and 23, are change gears to enable the spindle speed to be changed. From the shaft, 24, through which power is transmitted to the spindle as has been explained, power is taken to drive the feed shaft, 27, by a train of gears that includes a pinion, 28, keyed to the shaft, 24, a gear, 29, meshing therewith and journalled to revolve on the shaft, 21, a gear, 30, keyed to the gear, 29, and a gear, 31, meshing with the gear, 30, and loose on the feed shaft but which may be clutched thereto by a clutch, 32, of the roll type, the driven member of which is keyed to the feed shaft, 27, so that when such driven member is not revolved by the gear connection with that shaft, 21, fast enough to release the clutch through the rolls, the feed shaft, 27, will be driven through the train of gears, 28 to 31, and at work performing speed. Keyed to the driven member of the friction clutch, 32, is a gear, 33, which meshes with a gear, 34, which by a friction clutch, 35, is adapted to be clutched to the shaft, 21, and thereby the feed shaft, 27, is directly driven at a higher speed than it is driven by the train of gears, 28 to 31, which higher speed is to move the cutting tools during their idle movements to save time. The friction clutch, 35, is actuated by a lever, 36, on a rock shaft, 37, whose movements are automatically effected as hereinafter explained.

On the feed shaft, 27, is a pinion, 38, which meshes with a gear, 39, of the differential gearing which imparts the desired rate of revolution to the cam-drum D, which produces the to and fro movements of the tools with reference to the work on the chuck. The pinion, 38, is clutched to the feed shaft, 27, by a clutch face that engages a clutch face on a pinion, 40, keyed to the shaft, the pinion, 38, being slidable to clutch and unclutch it by means not necessary to be described to enable the cam-drum to be disconnected from the power drive for the purpose of turning the cam-drum for setting up the machine. The pinion, 40, drives a lubricating device not shown because it forms no part in the present invention.

For the automatic operation of members of the machine which must be done at certain predetermined times in the cycle of the machine, such for example, the shifting of clutches, dogs are employed which heretofore have been carried by dog-wheels or drums. The diameter of such drums is limited or circumscribed on account of space and other requirements so that comparatively little angular motion of the drum occurs for causing the dogs to act and such motion is slow so that for these two reasons the drum is an undesirable device for moving the dogs. By my invention the dogs are carried by an endless chain or the like flexible device whose length can be several times that of the circumference of a dog drum so that the rate of movement of a dog can be considerably greater than in the case of a dog carried by a drum, and thus the objections to the dog drum obviated.

Figure 2:
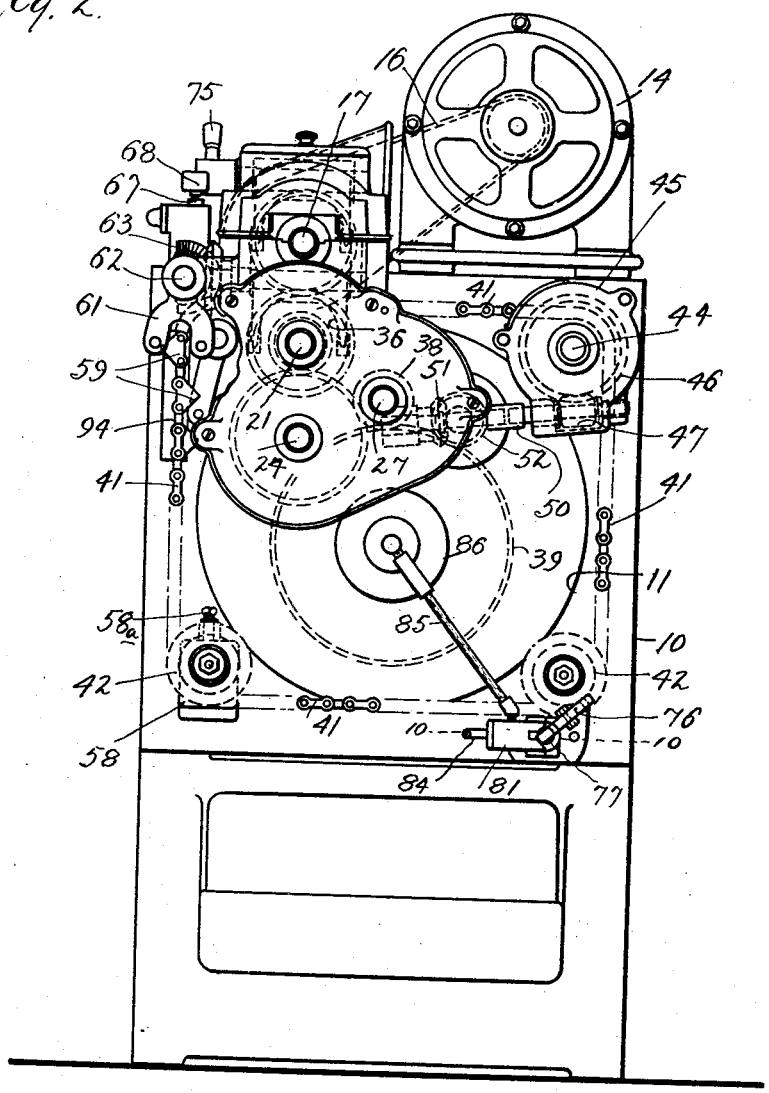
Fig. 2 is a rear elevation thereof.
Figure 3:
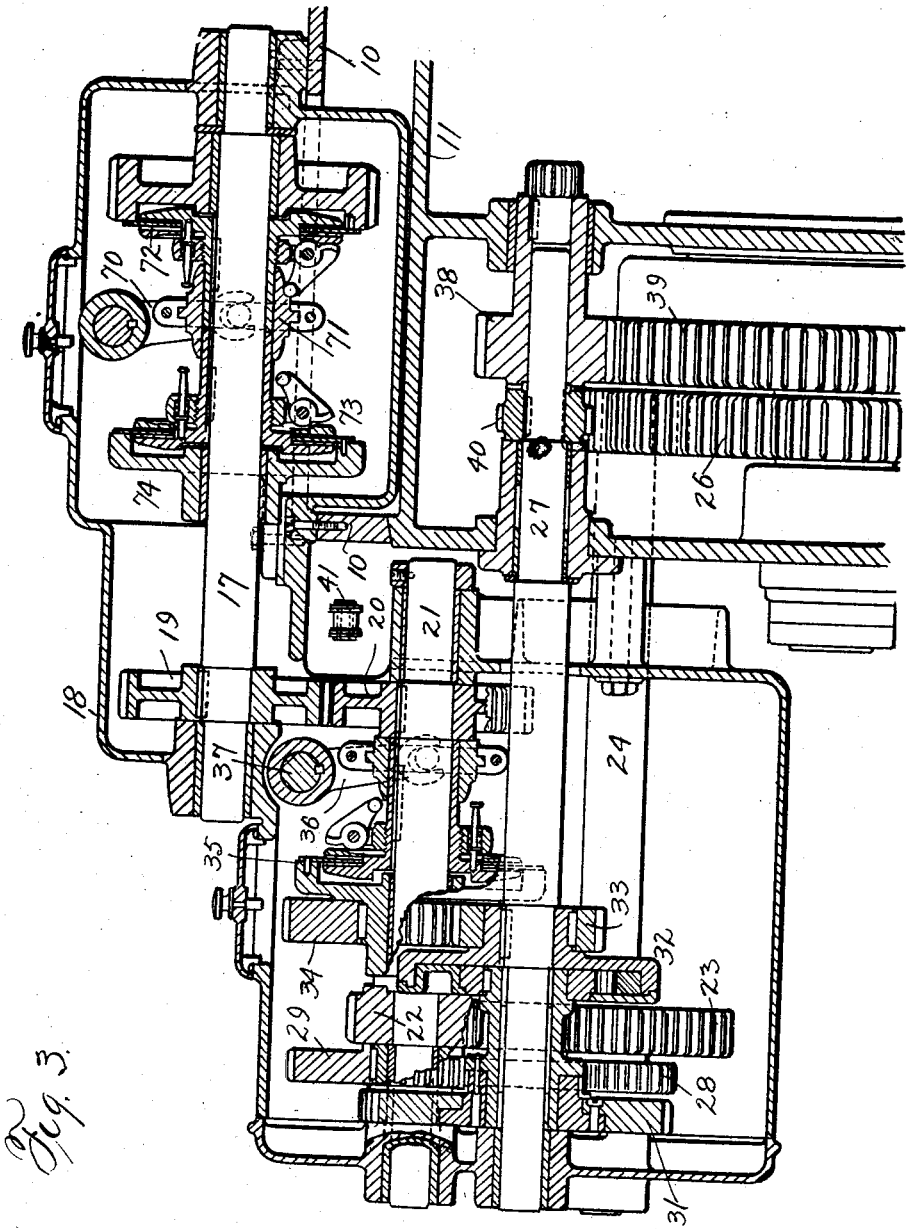
Fig. 3 is a longitudinal section of a portion of the machine to show certain of the gearing.

Referring to Figs. 2, 7, 11 and 12, it will be seen that I use a sprocket chain, 41, that extends in a rectangular course close to and parallel with the four straight sides of the outer casing member, 10, passing at each of the four corners over a sprocket wheel, three of which, 42, are idlers while the fourth, 43, is a driver. It will thus be seen that I get a length of chain several times the circumference of any wheel or drum that could be employed in the machine shown. The driver sprocket, 43, is keyed to a shaft, 44, journalled in bearings in a housing, 45, secured to the adjacent end of the outer casing member, 10, and upon said shaft is a worm wheel, 46, with which meshes a worm, 47, on a cross shaft, 48, supported at one end by said housing, 45, and at the other end by a bracket, 49, bolted to the end of the inner casing member, 11. The shaft, 48, is divided intermediate its ends and the two actions are coupled by a slip coupling, 50, to enable the two sections to be disconnected when the inner casing member is to be removed from the outer casing member. On the shaft section that remains with the inner casing member is a bevel pinion, 51, that meshes with a bevel pinion, 52, on a shaft, 53, that extends into the inner casing member and within the latter has keyed to it a pinion, 54, that meshes with the differential gear, 39, and thus the dog chain is timed with the cam-drum that reciprocates the tools.

The worm wheel 46, is loose on the shaft, 44, with a clutch face, 55, that is yieldingly held by a spring, 56, in mesh with a clutch face on the sprocket wheel, 43. By turning a nut, 57, on the threaded outer end of the shaft, 44, the worm wheel may be slid along the shaft out of clutching engagement and then the dog chain, disconnected from the power drive, can be moved by hand for setting up the machine by a crank applied to the outer end of the shaft.

For taking up slack in or adjusting the dog-chain, one of the idlers, 42, is mounted on a slide block, 58, that is engaged by an adjusting screw, 58ª.

At the proper points along the chain the dogs, 59, are secured (and as shown in Fig. 13 they may be applied to both sides of the chain). The chain being composed of links joined by pivot bolts, 60, the dogs may be very readily attached to the chain by bolts, 60, passing through the pivots.

Certain of the dogs, 59, are adapted to engage a lever, 61, for rocking the rock shaft, 37, that actuates the friction clutch, 35, said lever, 61, being forked, so that by the successive engagement of the opposite by acting dogs it may be rocked first in one direction and then the other. It is fixed to a rock shaft, 62, upon which is keyed a bevel gear segment, 63, that meshes with a bevel gear segment, 64, on said rock shaft, 37.

Another dog actuates a lever, 65, that at the proper time engages and releases a latch, 66, (see Figs. 6 and 7) which is thereby moved out of engagement with a notch at the side of a plunger rod, 67ª, which is moved to rock a lever, 68, by a spring, 67ᵇ, which lever controls the driving connection between the electric motor and the main drive shaft and thus disconnects the main drive shaft from the motor. The lever, 68, is fixed to a rock shaft, 69, which has fixed to it a lever, 70, that engages a collar, 71, slidable along the main drive shaft, 17, and on one side operates a friction clutch, 72, for the motor connection and on the other side operates a friction brake, 73, that includes a stationary member, 74, bolted to the housing so that immediately upon the unclutching of the drive shaft, 17, from the motor, the brake will be applied and revolution of the drive shaft and the parts geared thereto arrested. The lever, 68, has a handle, 75, for the workman to start up the machine.

Another dog operates the valve mechanism of pneumatic means for opening the chuck to release the work when it is finished, such dog at the proper time engaging a lever, 76, which engages the outer end of a slidable rod, 77, which has a bevel shoulder, 78, that engages and swings in one direction a lever, 79, (see Fig. 10) that moves a plunger, 80, in a passage in the valve box, 81, until it closes an air exhaust port, 82, and then engages the end of the stem of a valve, 83, and moves the valve off its seat and thus allows air flowing into the valve box from an inlet pipe, 84, to pass into a pipe, 85, and thence to the cylinder, 86, which through its piston rod (not shown) opens the clutch. Upon the opposite movement of the rod, 77, an air valve, 87, is moved from its seat by devices precisely similar to those for unseating the valve, 83, and air is supplied to the cylinder, 86, to close the chuck. The opposite movement of the rod, 77, is under control of the workman by means of a pedal lever, 88, which acts upon one end of a push-rod, 89, whose other end engages a bell-crank lever, 90, which is pivotally connected to the rod, 77. The push-rod, 89, is held out of contact with the lever, 90, by a coil spring, 91, so that when the valve operating rod, 77, is actuated by a dog it will not have to work against the load of the pedal and the push-rod. Movement of the pedal by the spring is limited by a stop, 92. To enable the workman to move the valve operating rod in both directions, at will if it be desired, a handle, 93, is provided on the bell-crank lever, 90.

Attention is called to the fact that the devices which are actuated by the chain dogs are located so that at the time the dogs engage therewith the portion of the chain which carries them is at a sprocket wheel and thus by the sprocket wheel the dogs are restrained from lateral movement by the thrust of the parts the dogs engage. If desired, stationary guide surfaces may be employed to sustain the dogs against the lateral thrust such for example, the guide in the form of a bar or rail, 94, bolted to the housing. See Figs. 12 and 13.

An important advantage of the dog-chain compared with the dog-drum or wheel, lies in the fact that it is feasible to have a number of chains for use with the same machine with the dogs set on the different chains to suit the timing required for the different jobs to be performed on the machine, which in the case of a dog-drum or wheel can only be accomplished by shifting the positions of the dogs on the wheel which takes considerable time. It is obviously impractical to have several dog-wheels for the same machine with the idea of substituting one wheel for another according to the requirements of the job, not only because of the difficulty involved in the removal and substitution, but the dog-wheel itself would be too expensive to enable a number to be supplied for use with the same machine. The objection as to removal of one dog-chain and the substitution of another does not exist, because it is simply a question of separating connected links by the removal of the bolt that connects them to remove a chain and to bolt the links together on the application of another chain and, of course, there is no comparison of cost of supplying a number of dog-chains for use with the same machine. To assure without trouble the proper application of a given dog-chain to the machine, it is necessary merely to place a mark upon one tooth of the driving sprocket wheel and to apply a matching mark to a corresponding link of the chain. The chain by reason of its lightness and flexibility when removed can be hung up in some convenient place until the job requiring its arrangement of dogs is again to be done on the machine.

What I claim is:

1. A machine tool comprising a work holder, and a tool holder that are movable relative to one another for work-performing and idle motions, and mechanism for causing such relative motion periodically that includes a movable device operatively connected with a holder, an engaging element, and a flexible carrier for such element adapted while the carrier is in motion and by its motion to operate said movable device.

2. A machine tool comprising a work holder, a tool holder, a power shaft, means operatively connecting the shaft and one of such holders to cause relative motion between such holders for the performance of a cutting operation on the work, such means including a controllable element and mechanism for periodically operating such controllable element that includes a member to act thereon and a flexible carrier for such member, and means to move said carrier and by its motion to cause said member to operate.

3. A machine tool comprising a work holder and a tool holder, a drive shaft, means operatively connecting the drive shaft and the tool holder to move the latter towards and from the work, including a controllable element and mechanism for periodically operating such controllable element that includes a member to act thereon and a flexible carrier for such member, and means to move said carrier and by its motion to cause said member to operate.

4. A machine tool comprising a tool holder, a chuck-carrying spindle, a drive shaft, means operatively connecting the drive shaft and the spindle and the tool holder, including a controllable element for starting and stopping the spindle revolution, and mechanism for periodically operating such controllable element that includes a member to act thereon and a flexible carrier for such member, and means to move said carrier and by its motion to cause said member to operate.

5. A machine tool comprising a tool holder, a chuck-carrying spindle, a drive shaft, a gear connection between the drive shaft and the spindle for revolving the spindle at various speeds, clutch means for such gear connection and mechanism for periodically operating such clutch means that includes a member to act thereon and a flexible carrier for such member, and means to move said carrier and by its motion to cause said member to operate.

6. A machine tool comprising a work holder, a tool holder, a drive shaft, a gear connection between the drive shaft and one of said holders to impart feed movement thereto to bring the work and tool together, control means for such gear connection, and mechanism for periodically operating such control means that includes a member to act thereon and a flexible carrier for such member and means to move said carrier and by its motion to cause said member to operate.

7. A machine tool comprising work and tool holders and mechanism for causing certain periodical motions that includes a flexible dog-carrying member, means to support said member for travel in a fixed path, means for imparting feed movement to one of said holders and to said flexible dog-carrying member, a casing comprising outer and inner members which are separable, said means for producing feed movement being supported by the inner member and said dog-carrying member being supported by said outer member and the driving connection between said flexible member and said members for producing feed movement being separable.

8. A machine tool comprising work and tool holders, a main drive shaft, means for clutching said shaft to a motor, a feed shaft, a constant speed shaft, gearing connecting the drive shaft and the work holder and the feed shaft, gearing connecting the constant speed shaft and the feed shaft for driving the feed shaft independently of the work holder and automatic means for operating the clutch connection between the main shaft and the motor, and a casing comprising outer and inner members which are separable, the inner member supporting so as to be removable therewith all of the before mentioned elements except the work and tool holders.

9. A machine tool comprising work and tool holders and mechanism for causing certain periodical motions that includes a flexible dog-carrying member from which the dog or dogs carried thereby project and are adapted to act while said member is in motion, means to support said member for travel in a fixed path, and dog operated devices that control the grip of the work holder on the work including a dog-engaged element with which the dog coacts.

10. A machine tool comprising work and tool holders and mechanism for causing certain periodical motions that includes a flexible dog-carrying member from which the dog or dogs carried thereby project and are adapted to act while said member is in motion, means to support said member for travel in a fixed path, and dog operated devices that stop the operation of the machine on the completion of its cycle including a dog-engaged element with which the dog coacts.

11. A machine tool comprising a work spindle having a chuck, pneumatic chuck operating means including valve mechanism, a flexible dog-carrying member, means to support said member for travel in a fixed path, a dog-operated device for actuating said valve mechanism, and means operable at the will of the operator to operate said valve mechanism.

12. A machine tool comprising work and tool holders, means for moving the tool holder at different speeds including a clutch, and means controlling the operation of said clutch comprising a flexible dog-carrying member from which dog or dogs carried thereby project and are adapted to act while said member is in motion and a dog-operated device.

In testimony whereof I hereunto affix my signature.

WILLIAM WALLACE POTTER.